(12) United States Patent
Katzer et al.

(10) Patent No.: US 8,307,110 B1
(45) Date of Patent: Nov. 6, 2012

(54) DYNAMIC SCHEDULING OF ELECTRONIC CONTENT UPDATES

(75) Inventors: Robin D. Katzer, Olathe, KS (US); Sei Y. Ng, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 720 days.

(21) Appl. No.: 12/498,496

(22) Filed: Jul. 7, 2009

(51) Int. Cl.
*G06F 15/16* (2006.01)
(52) U.S. Cl. .................................. 709/232; 709/219
(58) Field of Classification Search .................. 709/232
See application file for complete search history.

(56) References Cited

U.S. PATENT DOCUMENTS

| | | | |
|---|---|---|---|
| 7,533,188 B1 * | 5/2009 | Greger | 709/248 |
| 7,653,689 B1 | 1/2010 | Champagne et al. | |
| 7,984,300 B2 * | 7/2011 | Fredlund et al. | 713/176 |
| 2002/0065097 A1 * | 5/2002 | Brockenbrough et al. | 455/552 |
| 2003/0004998 A1 * | 1/2003 | Datta | 707/513 |
| 2003/0140092 A1 * | 7/2003 | Caruso et al. | 709/203 |
| 2005/0210128 A1 * | 9/2005 | Cannon et al. | 709/224 |
| 2006/0224943 A1 | 10/2006 | Snyder et al. | |
| 2008/0091773 A1 * | 4/2008 | Hameen-Anttila | 709/203 |

OTHER PUBLICATIONS

Williams, Anthony. "Reduce Bandwidth Usage by Supporting If-Modified-Sice in PHP". Sep. 30, 2007. <http://www.justsoftwaresolutions.co.uk/webdesign/provide-last-modified-headers-and-handle-if-modified-since-in-php.html>. pp. 1-5.*
Katzer, Robin D., et al., Patent Application entitled, "Parallel Management of Load Servers, Cache Servers, and Feed Servers," filed Feb. 3, 2009, U.S. Appl. No. 12/365,170.
Pre-Interview Communication dated Dec. 2, 2011, U.S. Appl. No. 12/365,170, filed Feb. 3, 2009.
Notice of Allowance dated Jun. 15, 2012, U.S. Appl. No. 12/356,170, filed Feb. 3, 2009.

* cited by examiner

*Primary Examiner* — Christopher Biagini

(57) ABSTRACT

A method comprises a server receiving a message from a device requesting content. The server reads a first time record for the previous receipt of content. The server compares the first time record with a second time record for the content stored in cache. When the second time record is newer than the first time record, the server sends the requested content. When time records match, the device is advised of refresh time and to request later. When the message lacks a time record, the requested content is sent. When cache does not contain requested content, a data loader obtains content from a server. A message to the device advises the time to obtain the content and to request again later. When cache does not contain the content and the server is unavailable, the data loader determines the time of network availability. A message sent to the device advises of availability time and to request again later.

7 Claims, 8 Drawing Sheets

DYNAMIC SCHEDULING OF ELECTRONIC CONTENT UPDATES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet media publishers provide information that may be updated frequently for consumption by users seeking stock market quotations and other business news, scores of sporting events, weather forecasts, airline flight information, and highway traffic information. Some Internet sites update a standardized display of information at periodic intervals. Other internet sites may provide an interface supporting a user selecting specific items of information they wish to be updated, such as a flight arrival time. The proliferation of mobile devices has promoted expansion of information delivery applications directed to mobile devices, and the demand for frequently refreshed information will continue to grow.

SUMMARY

In an embodiment, a processor-implemented method of retrieving and delivering requested content is provided. The method comprises a feed server receiving a first message from an electronic device containing a request for content. The method also comprises the feed server reading in the request a first time record associated with a previous receipt of content by the electronic device. The method also comprises the feed server comparing the first time record with a second time record, the second time record associated with the content stored on a cache server. When the second time record is more current than the first time record, the method also comprises the feed server sending a second message to the electronic device containing the content stored on the cache server. When the second time record matches the first time record, the method also comprises the feed server sending a third message to the electronic device, the third message identifying a scheduled time to refresh the content on the cache server and the third message further indicating to resend the request for content at one of the scheduled time to content refresh and at a later time. When the first message does not contain the first time record, the method also comprises the feed server sending a fourth message to the electronic device containing the requested content. When the cache server does not contain the requested content, the method also comprises the feed server sending a fifth message to a data loader server with a request to determine the time to obtain the requested content from a content server and the feed server sending a sixth message to the electronic device, the sixth message advising of the time to obtain the requested content and the sixth message further containing advice to resend the request for content at one of the time to obtain the requested content and at a later time. When the cache server does not contain the requested content and the content server is unavailable to produce the requested content, the method also comprises the feed server sending a seventh message to the data loader server requesting the data loader server to determine the time of network availability and the feed server sending an eighth message to the electronic device, the eighth message advising of the time of network availability and the eighth message further containing advice to resend the request for content at one of the time of network availability and at a later time.

In another embodiment, a processor-implemented method of retrieving and delivering requested content is provided. The method comprises a feed server receiving a first message from a first electronic device containing a request for content and receiving a second message from a second electronic device containing a request for the same content, the feed server receiving the first message and the second message at about the same time. The method also comprises the feed server reading in the first message a first time record associated with a previous update to the content received by the first electronic device. The method also comprises the feed server reading in the second message a second time record associated with a previous update to the content received by the second electronic device. The method also comprises the feed server comparing the first time record and the second time record with a third time record, the third time record associated with the requested content stored on a cache server. The method also comprises the feed server determining that the first time record and the second time record match the third time record. The method also comprises the feed server sending a third message to the first electronic device, the third message advising that the content associated with the first time record is the most currently available content and the third message further containing advice to resend the request for content at one of a scheduled time to content refresh and at a later time. The method also comprises the feed server sending a fourth message to the second electronic device, the fourth message advising that the content associated with the second time record is the most currently available content and the fourth message further containing advice to resend the request for content at one of a time comprising the scheduled time to content refresh plus an interval and at a later time.

In another embodiment, a processor-implemented method of processing content requests is provided. The method comprises a feed server receiving a first message from an electronic device, the first message requesting a recommendation for consolidation of a content request schedule used by the electronic device. The method also comprises the feed server analyzing the content request schedule associated with the electronic device. The method also comprises the feed server examining the refresh update schedules of the sources of content regularly accessed by the electronic device. The method also comprises the feed server examining the impact of the content request schedule on network traffic and server resources. The method also comprises the feed server determining a realignment of the content request schedule with the refresh update schedules of the content sources regularly accessed by the electronic device, the realignment consolidating the quantity of individual content requests submitted by the electronic device into a reduced quantity of content request messages sent to the feed server. The method also comprises the feed server transmitting the realignment of the content request schedule to the electronic device. The method also comprises he electronic device implementing the realignment of the content request schedule.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
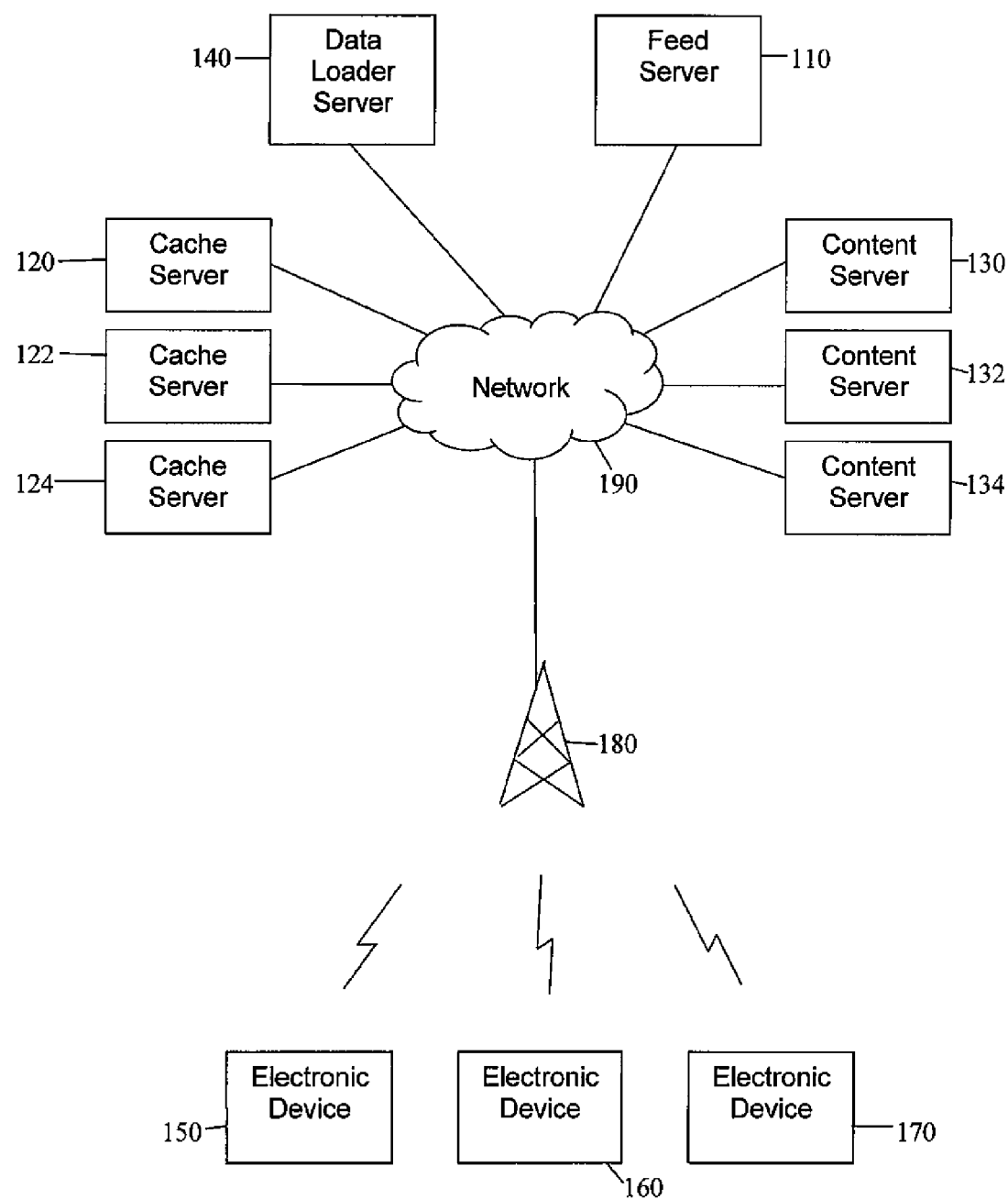
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments teach methods for dynamic scheduling of electronic content updates providing regularly refreshed information for a large audience of electronic devices and providing notice of the next availability of refreshed data when the information is requested by the electronic devices. By providing information about the next scheduled update to data requested by electronic devices, the system may influence users of electronic devices to initiate contact with the system at the time the refreshed data is available and not prior. By reducing instances of electronic devices initiating contact with the system only to learn that the electronic devices already have the most current data, the system may improve service to electronic devices and may reduce unnecessary network traffic and burden on servers.

Some electronic devices desire frequent information updates about the stock market, weather forecasts, sports scores, airline flight information, and other information subject to frequent change. Such electronic devices may be used under plans with wireless service providers that access current information from content providers that periodically update this data. Wireless service providers may receive content updates from the content providers at predetermined time intervals. Electronic devices that request content updates more frequently than the corresponding content is updated by the content providers place an unnecessary burden on communication networks. In an embodiment, the electronic device encapsulates a time record, time log, and/or timestamp that indicates the most recent content received by the electronic device in a content request message. The time record may comprise an indication of time and an indication of date. The time record may comprise only an indication of time. The time record may be implemented using a variety of time designations known to those skilled in the information technology arts and/or the computer programming arts. The time record may represent a passage of time since an understood reference time, for example number of seconds after an understood reference time. The time record may be implemented in other ways. The electronic device transmits the content request message to the system. The system may compare the time record contained in the content request message with a time record associated with the current version of the corresponding content stored in its cache servers. When comparison of the two time records indicate that the electronic device has the most current information and there has been no update since the previous time the electronic device requested content, the system informs the electronic device of the next scheduled update of the requested content, and the electronic device schedules the content request to occur after the update. This arrangement is asynchronous wherein the electronic device does not wait on the line until the refreshed content is available and again requests the content at the later time when the refreshed content is available. In this embodiment, network resources are not consumed while the electronic device waits on the line. Additionally, some, but not all, electronic devices, by terminating their content request sessions, may become available to receive incoming voice calls.

When a content request transmitted by the electronic device encapsulates a time record that is older than the time record associated with the data presently stored by the system or when the content request contains no time record, the system may provide its currently stored data to the electronic device. If the electronic device requests a content update that the system is unable to satisfy because the system does not have the content at all, either because the system is waiting for an expected update from its Internet source or the content provider cannot be contacted for any reason, the system determines a time to obtain the content or a time to network availability, respectively. The system uses these determinations to determine a callback time to communicate to electronic devices requesting the subject content or requesting content from the subject content provider. Time to data refresh, time to obtain data, and time until network availability are three primary measures that the system uses in recommending callback times to electronic devices that have requested content and not been provided a desired content update. The determination of callback times is dynamic, may be based on overall network load, and may be based on historic data availability times, prior record of turning callers away, and previous system outages. The system continuously refines the quality of its service by examining its historic performance in providing updates in response to callback recommendations based on these measures. The system seeks to reduce instances of recommending a callback time to an electronic device only to again not have the requested information available upon callback, thus entailing the electronic device again requesting the content.

When the system receives irregular updates of information from content providers and therefore cannot determine the schedule for content updates, the system may employ statistical techniques to determine the best times to advise electronic devices to call back into the system. This may be useful, for example, when scores of ongoing sporting events are unpredictably changing every few minutes and requests for that content are frequent. When content is scheduled to be updated at a specific time and a large number of electronic devices are expected to request the content from the system at the specific time for an update, the system can stagger its recommended callback times to the electronic devices so the system is not overwhelmed by content requests. In an embodiment, the system may also review the content updates that an electronic device regularly requests, analyze the times that the system receives updates of the content from the content provider, and recommend to the electronic device a schedule for requesting the content that uses network resources more efficiently. If an electronic device can reduce its average daily content requests sent to the system from, for example, fifteen to five, with negligible loss of content freshness, better service to the user of the electronic device may be provided and network resources may be conserved.

Turning now to FIG. 1, a system 100 for dynamic scheduling of electronic device updates is provided. The system 100 comprises a feed server 110, a cache server 120, a content server 130, a data loader server 140, an electronic device 150, a wireless base station 180, and a network 190. In some embodiments, additional cache servers 122, 124, additional content servers 132, 134, and additional electronic devices 160, 170 will be present and active in the system 100. Attributes and functionality described with reference to the cache server 120 are representative of the attributes and functionality of the additional cache servers 122, 124. Attributes and functionality described with reference to the content server 130 are representative of the attributes and functionality of the additional content servers 132, 134. Attributes and functionality described with reference to the electronic device 150 are representative of the attributes and functionality of the additional electronic devices 160, 170.

Electronic devices 150, 160, 170 request content from the feed server 110, and the feed server 110 delivers the requested content to the electronic devices 150, 160, 170. When the feed server 110 receives a message from an electronic device 150 requesting entirely new content or an update to content previously sent to the electronic device 150, the feed server 110 requests the content from one of the cache servers 120, 122, 124 and sends it to the electronic device 150. Cache servers 120, 122, 124 periodically receive content transmissions from content servers 130, 132, 134. Cache servers 120, 122, 124 store content refreshes received in periodic updates from content servers 130, 132, 134 and make the stored content available to the feed server 110 for delivery to the electronic device 150 upon request. Each cache server 120 may store the same content stored by the additional cache servers 122, 124 for fault tolerance and/or load sharing purposes. The feed server 110 may request content from cache servers 120, 122, 124 on a random or rotating basis. If the electronic device 150 requests content that the feed server 110 cannot locate on any cache server 120, 122, 124, the feed server 110 may request the data loader server 140 to obtain the content from the content servers 130, 132, 134 and send it to the cache servers 120, 122, 124.

Additional information about scheduling and delivering electronic content and supporting infrastructure is provided in U.S. patent application Ser. No. 12/365,170 entitled Parallel Management of Load Servers, Cache Servers, and Feed Servers filed Feb. 3, 2009, by Robin D. Katzer, et al. which is incorporated herein by reference for all purposes.

The feed server 110 may be operated by a provider of wireless services including wireless voice and data services including short message service (SMS), electronic mail, and Internet service. In an embodiment, electronic devices 150, 160, 170 may be mobile telephones or other mobile devices that may request content from the feed server 110. The feed server 110 may use the really simple syndication (RSS) technology to feed content drawn from cache servers 120, 122, 124 to electronic devices 150, 160, 170.

Content servers 130, 132, 134 store electronic content. Electronic content stored by content servers 130, 132, 134 is transmitted through the data loader server 140 to cache servers 120, 122, 124 for storage and transmission through the feed server 110 to electronic devices 150, 160, 170 that request the content. In some contexts, content servers 130, 132, 134 may be referred to as web servers or web sites. Content servers 130, 132, 134 may be associated with news organizations, airlines, government bodies, weather services, and other entities that generate information about news, weather, sports, transportation, and other content.

The data loader server 140 creates and configures the electronic channels between content servers 130, 132, 134 and cache servers 120, 122, 124 and schedules communication sessions between them. The data loader server 140 may oversee the formatting and presentation of the data received from the content servers 130, 132, 134 and the storing of the data on the cache servers 120, 122, 124. Components of the data loader server 140 receive electronic content from content servers 130, 132, 134 and may apply software techniques to convert the format of the content for storage on the cache servers 120, 122, 124 and transmission and display to the electronic devices 150, 160, 170. The data loader server 140 may deal with the content servers 130, 132, 134 under service level agreements (SLA) that a wireless service provider may have with providers of Internet and other electronic content. The data loader server 140 may be operated by a wireless service provider and may be the wireless service provider's primary interfacing component with Internet sites and their associated content servers 130, 132, 134. In an embodiment, the content servers 130, 132, 134 may update an item of content every five minutes, but under a service level agreement, the data loader server 140 only draws that updated content for storage on the cache servers 120, 122, 124 every ten minutes.

The electronic device 150, 160, 170 may be one of a mobile telephone, a personal digital assistant (PDA), a media player, a laptop computer, a tablet computer, or other electronic device having wireless communication capability. An exemplary embodiment of an electronic device 150, 160, 170 is described in detail hereinafter. In an embodiment, the electronic device 150 may be referred to as the first electronic device 150, the electronic device 160 may be referred to as the second electronic device 160, and the electronic device 170 may be referred to as the third electronic device 170.

The wireless base station 180 may be any of a cellular wireless base station, for example a Code Division Multiple Access (CDMA), Global System for Mobile Communications (GSM), long-term evolution (LTE), and/or Universal Mobile Communications System (UMTS) cellular wireless base station; a World-wide Interoperable Microwave Access (WiMAX) base station; a WiFi access point; or other wireless access device. While a single wireless base station 180 is depicted in FIG. 1, a plurality of wireless base stations 180 may be used because electronic devices 150, 160, 170 may roam across a plurality of wireless coverage areas.

The network 190 promotes communication between the components of the system 100. The network 190 may be any communication network including a public data network (PDN), a public switched telephone network (PSTN), a public land mobile network (PLMN), a private network, and/or a combination thereof.

Figure 2A:
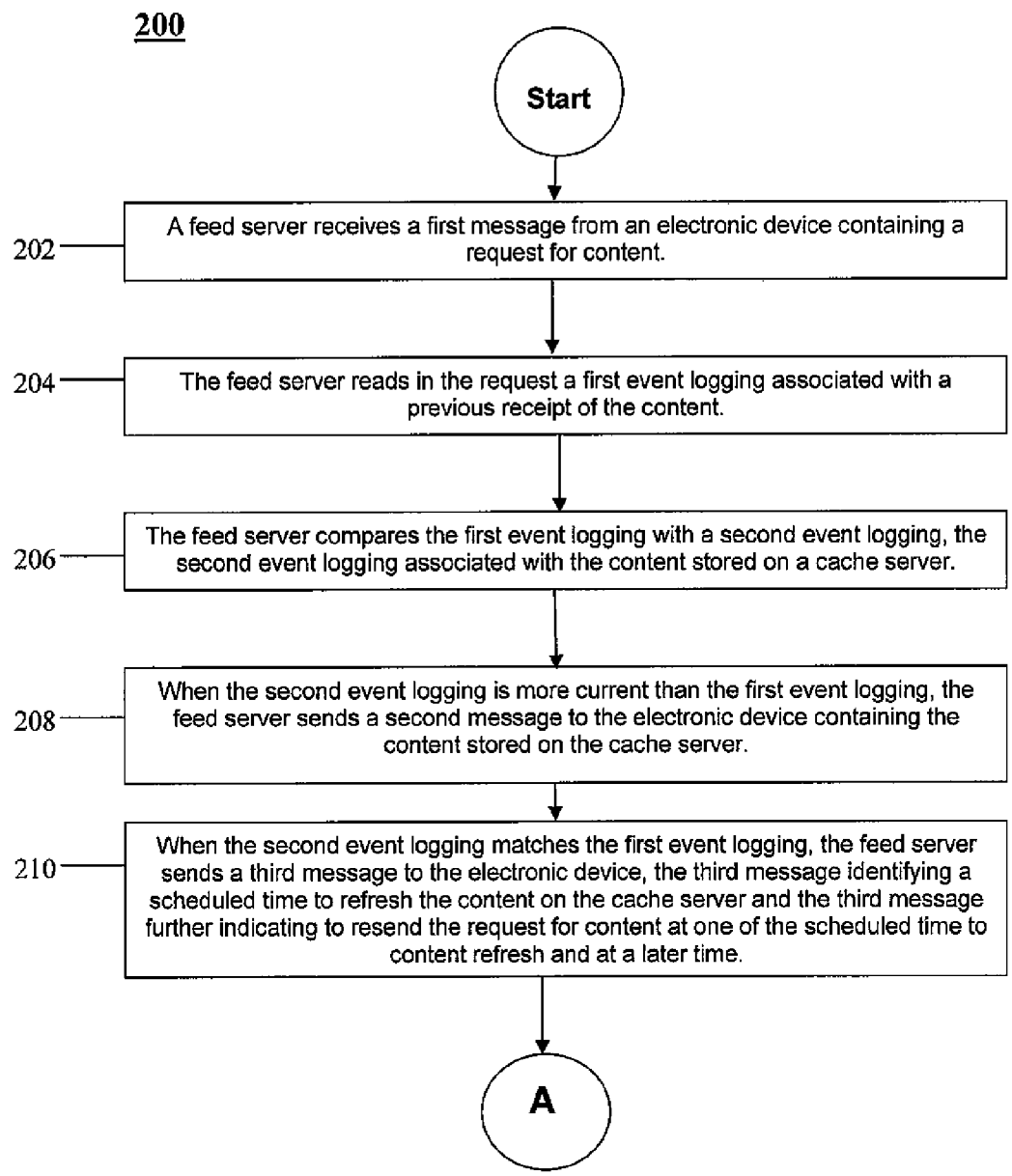
FIGS. 2a and 2b depict a flow chart illustrating a method according to an embodiment of the disclosure.
Figure 2B:
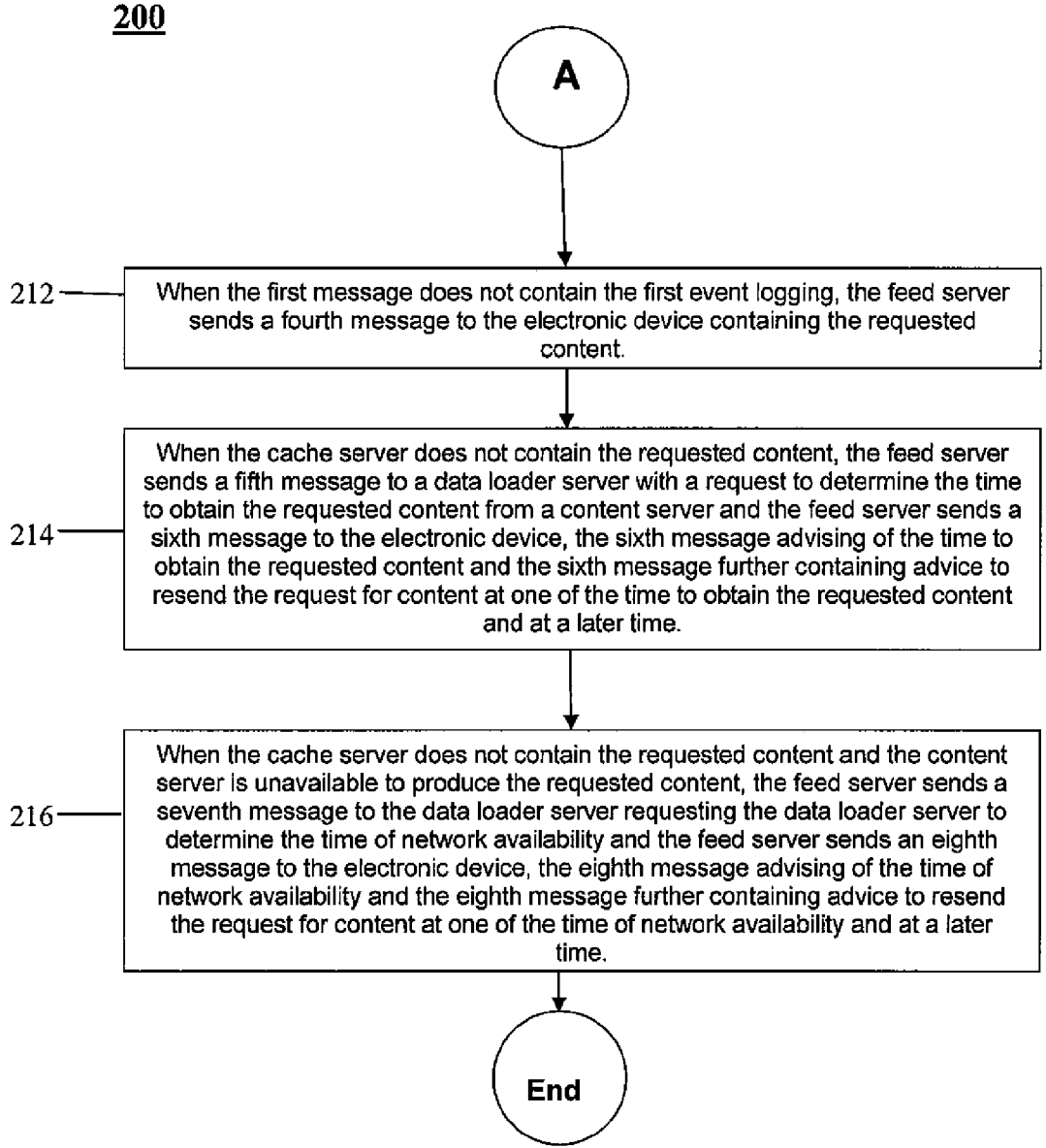

Turning now to FIG. 2a and FIG. 2b, a method 200 of dynamic scheduling of electronic device updates is provided. At block 202, the feed server 110 receives an initiating message from the electronic device 150. The initiating message may contain a request for content. The initiating message may request an update of content requested and received in a previous transmission. The initiating message may alternatively request content not previously requested by the electronic device 150.

At block 204, the feed server 110 reads a first time record in the initiating message. The first time record may be associated with the content previously received by the electronic device 150. In an embodiment, the initiating message may also include the previous content. For example, an investor in the XYZ Company may seek a current stock price. Earlier in that day on Jan. 26, 2009 at 1:05 PM Eastern Standard Time, for example, the investor received a current trading price of $27.50 per share. When the investor using the electronic device 150 submits his or her request for a current price, the time record may read, for example, "01262009 1305 EST XYZ 27.50". In the event the electronic device 150 had not previously requested this content, the initiating message may comprise a time record that has a null value, for example a value that does not correspond to a number or a number that is not in standard time record format, or the initiating message may not include a time record at all.

At block 206, the feed server 110 compares the first time record with a second time record. The second time record is associated with the current content stored in the cache server 120 that the electronic device 150 has requested.

At block 208, if the feed server 110 determines that the second time record is more recent than the first time record, the feed server 110 concludes that the version of the requested content stored in the cache server 120 is more current than the version of the content presently in possession of the electronic device 150. When this occurs, the feed server 110 may send a responding message to the electronic device 150 providing the updated content. In an embodiment, when it is determined that the electronic device 150 has outdated content, the updated content may be sent to the electronic device 150 without the electronic device 150 terminating its originating call and waiting for a reply callback. In this embodiment, the initiating message and the responding message are exchanged during the one call originated by the electronic device 150.

At block 210, if the feed server 110 determines that the first time record matches the second time record, the feed server 110 may conclude that the electronic device 150 has the most current content available to the system 100. The feed server 110 provides this advice in a confirming message to the electronic device 150. The feed server 110 also determines when content is scheduled for update and includes this content in the confirming message. The scheduled time to data refresh for that item of content may be a periodic interval, for example every five minutes, every ten minutes, every fifteen minutes, every thirty minutes, every hour, or another periodic interval. Time to data refresh for a plurality of items of content may be stored in a file in the feed server 110, the data loader server 140, or the cache server 120. In an embodiment, when an electronic device 150 is provided a callback recommendation, the callback may be defined as one of an interval of time from the time of the call by the electronic device 150. In another embodiment, the callback may be defined as a specific clock time, such as "1430 EST or later."

The system 100 has the flexibility to dynamically change the scheduled time to data refresh due to demand from electronic devices 150, 160, 170 and/or activity related to the content sought. For example, extreme and sudden changes in the weather or an approaching storm may prompt the system 100 to change the interval for available content updates for weather content from every thirty minutes to every five minutes. A sharp spike in trading volume for a certain publicly traded common stock during an economic crisis or emergency may prompt a change in time interval for data refresh of that stock price quotation. By contrast, when electronic devices 150, 160, 170 seek news for a particular sport during that sport's off season, updates may be available only every three hours as opposed to every thirty minutes when the sport is in season.

At block 212, if the initiating message sent by the electronic device 150 does not contain a time record, this may indicate to the feed server 110 that this is the first time that the electronic device 150 is requesting the content. This may alternatively indicate that the electronic device 150 has previously received this content but deleted it. In this instance, the feed server 110 may draw the current version of the requested content from the cache server 120 and synchronously provide the content to the electronic device 150.

At block 214, there may be instances when the electronic device 150 may request an update to previously received content or content not previously requested and the particular content cannot be found on any cache server 120, 122, 124. In this case, the content may never have previously been requested by an electronic device 150, 160, 170. Alternatively, the content may have at one time been stored on a cache server 120, 122, 124 but may have subsequently become corrupted or been intentionally deleted for some reason. In this instance, the data loader server 140 may be tasked with establishing communication with one or more content servers 130, 132, 134 and requesting the content. While it may not be possible to determine beforehand the amount of time required for the data loader server 140 to issue this request, receive and process a reply from at least one content server 130, 132, 134, and post the content on the cache servers 120, 122, 124, the system 100 seeks to provide an acceptable level of service to electronic devices 150, 160, 170. The feed server 110 in conjunction with the data loader server 140 estimates a time to obtain content and provides this information to the electronic device 150 in the form of a recommended callback time for the electronic device 150. The estimation of time to obtain the desired content may be based on previous interactions with the at least one content server 130, 132, 134 expected to provide the content, known previous demand for the content if the content is frequently requested, and the amount of time it may take the data loader server 140 to verify, process, and store the content on the cache servers 120, 122, 124 once it has been received.

At block 216, the electronic device 150 may submit a request for new or updated content and the feed server 110, after first determining that the requested content is not available on one of the cache servers 120, 122, 124, sends another message to the data loader server 140 and is then notified that the content server 130 that normally provides the requested content is not available. The content server 130 may be unavailable because the network connection between the data loader server 140 and the content server 130 is presently congested or has failed. The task of the data loader server 140 is to determine when the network connection to the content server 130 will be restored or the previously down content server 130 will be back online. When the network connection to the content server 130 is congested or has failed, the data loader server 140 may search for an alternate network path to the content server 130. When the Internet site with which the content server 130 is associated is down, the data loader server 140 may attempt to locate and access alternate content servers that contain the desired content available through alternate content servers 132, 134. While the data loader server 140 is attempting to find an alternate network connection to the functioning content server 130 or find a temporary replacement for the failed content server 130, the data loader server 140 determines a time of network availability, essentially a prediction of when data loader server 140 will have re-established a connection with the content servers 130, 132, 134, received and processed the requested content, and stored the content in the cache server 120. When the time of network availability has been determined, the feed server 110 sends a notification to the electronic device 150 advising it of the time of network availability with a recommendation to call back for the requested content at that time.

The three measurements of time to data refresh, time to obtain data, and time to network availability described in the method 200 may be estimates made by the system 100 when the content requested by electronic devices 150, 160, 170 is not immediately available. These estimates are made based on the factors discussed and represent a balance between the system 100 seeking to provide the electronic device 150 an opportunity to get the desired content as quickly as possible and seeking to avoid a situation wherein the electronic device 150 is directed to call back at a certain time, and upon doing so, is advised that the desired content is still not available. The data loader server 140 and feed server 110 employ statistical techniques and analyze empirical data to achieve this balance and optimize service to electronic devices 150, 160, 170.

Figure 3:
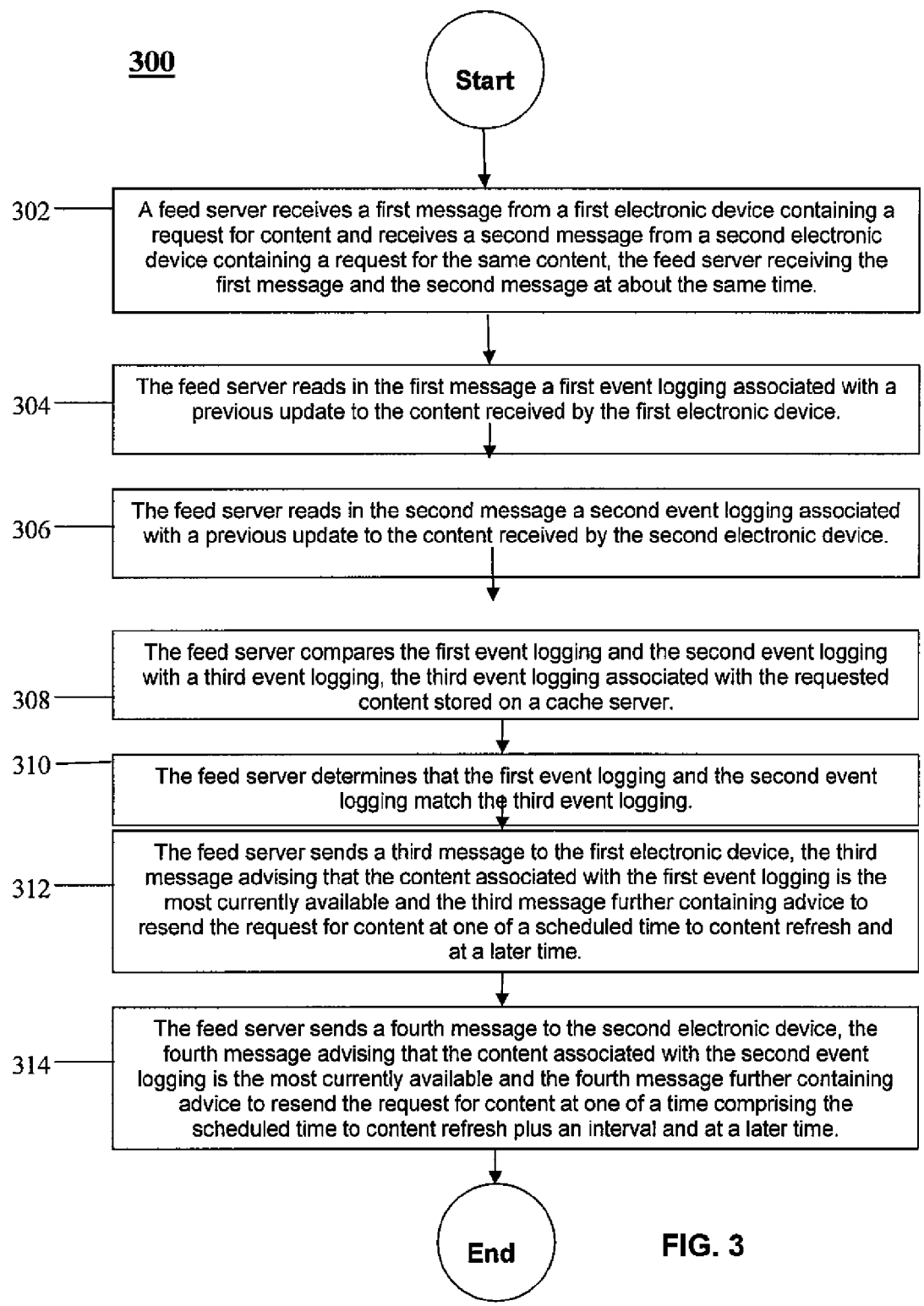
FIG. 3 is a flow chart illustrating another method according to an embodiment of the disclosure.

Turning now to FIG. 3, a processor-implemented method 300 of retrieving and delivering requested content is provided. Beginning at block 302, the feed server 110 at around the same time receives separate requests from the first electronic device 150 and from the second electronic device 160. The feed server 110 determines that the separate requests are for updates to the same content.

At block 304, the feed server 110 reads a first time record associated with the request from the first electronic device 150 and at block 306, the feed server 110 reads a second time record associated with the request from the second electronic device 160. In an embodiment, each time record provides the date and time information associated with the immediately previous update to the requested content received by the respective first and second electronic devices 150, 160. In another embodiment, the time records may provide an indication of time in a variety of formats. In an embodiment, the time records may not comprise an indication of time. In an embodiment, the time records may comprise an indication of passage of time since an understood reference point. In an embodiment, the time records may comprise an indication of seconds since a reference point, for example seconds since midnight on the current day or seconds since a reference time in the past, for example midnight Jan. 1, 1970.

At block 308, the feed server 110 compares the first time record and the second time record with a third time record that is associated with the requested content presently stored in the cache server 120. At block 310, the feed server 110 determines that the first time record, the second time record, and the third time record match each other, meaning both the first electronic device 150 and the second electronic device 160 have the same current content as is presently stored and available in the cache server 120. The feed server 110 and the data loader server 140 may determine a time to content refresh, the time when a new update of the desired content will be generated by the content server 130 and stored on the cache server 120.

At block 312, the feed server 110 sends a responding message to the first electronic device 150 notifying it that the content presently in the possession of the first electronic device 150 is the most current content. The responding message further advises the first electronic device 150 of the time to content refresh, either expressed as a period of time from the present time or as a clock time, for example 5:15 PM.

At block 314, substantially concurrent with the processing at block 312, the feed server 110 sends notification to the second electronic device 160 advising that the content presently in the possession of the second electronic device 160 is the most current content. The notification further advises the second electronic device 160 of the time to content refresh, either expressed as a period of time from the present time or as a clock time, for example 5:16 PM.

The method 300 in the example used staggered the recommended callback time for the second electronic device 160 by one minute after the recommended callback time for the first electronic device 150. Staggering recommended callback times for electronic devices 150, 160, 170 may distribute incoming callback volume when volume is heavy for content in demand, such as a sports score or a news update about a potential weather event such as a hurricane or tornado. In an embodiment, many thousands of electronic devices 150, 160, 170 may be interested in an update at one time for a sports score and the system 100 may recommend callbacks for segmented groups of the electronic devices 150, 160, 170 staggered by tens or hundreds of milliseconds. In an embodiment, a wireless service provider may synchronize the time kept by each of the electronic devices 150, 160, 170.

Figure 4:
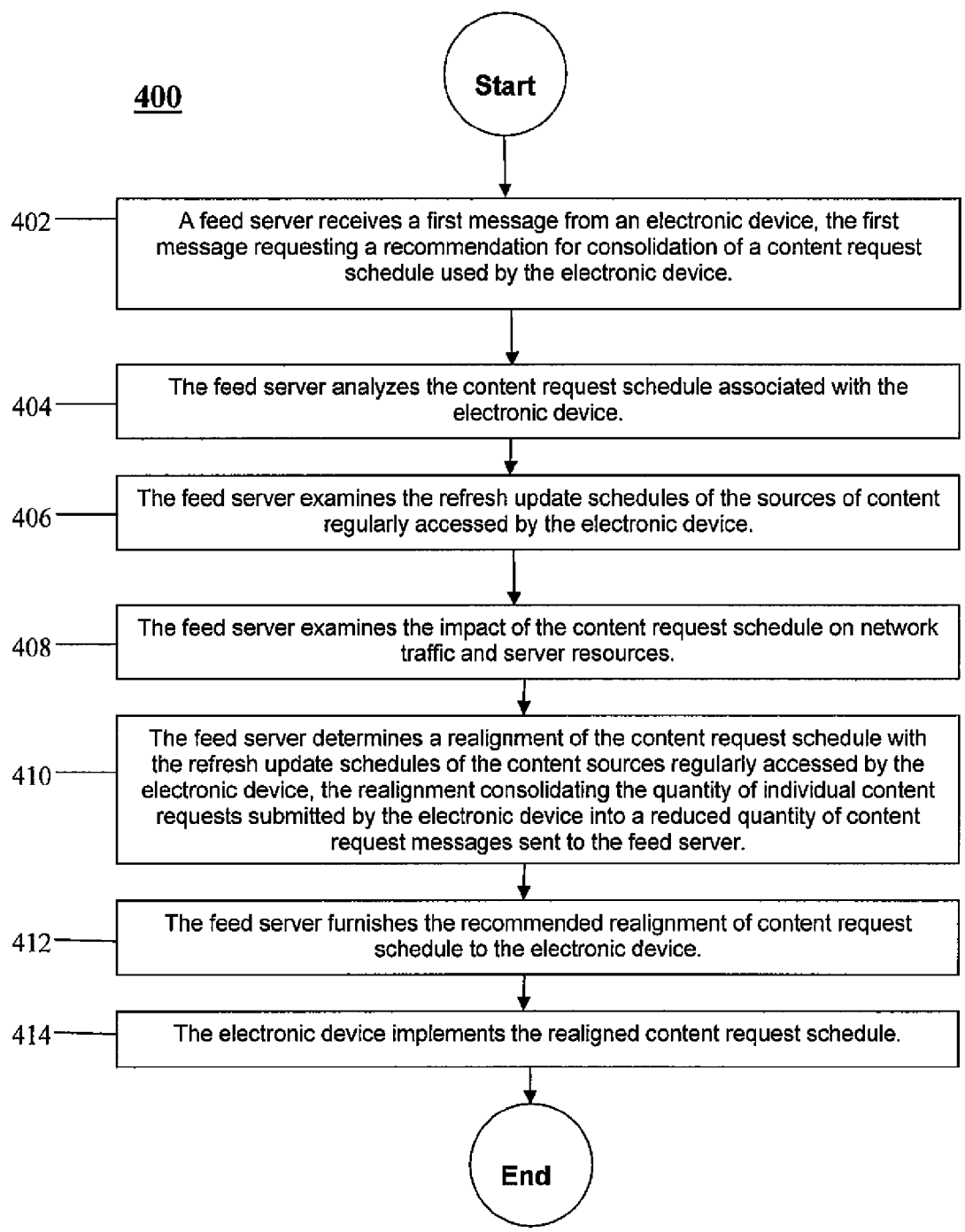
FIG. 4 is a flow chart illustrating another method according to an embodiment of the disclosure.

Turning now to FIG. 4, a processor-implemented method 400 of processing content requests while retrieving and delivering requested content is provided. Beginning at block 402, the feed server 110 receives a message from the electronic device 150. The message requests an analysis and recommendation for potential realignment of the content request schedule used by the electronic device 150.

The user of the electronic device 150 at block 402 is requesting that the feed server 110 in conjunction with the data loader server 140 examine the typical schedule or patterns of content requests submitted by the electronic device 150 and analyze it with reference to the refresh update schedules of content that the electronic device 150 regularly requests. The electronic device 150 may have determined that it is receiving an excessive quantity of reply messages from the feed server 110 advising the electronic device 150 to request content again at a later time, indicating that the electronic device 150 is requesting content too often or requesting content at the wrong times. In the method 400, the electronic device 150 is depicted as initiating the request for this examination of content request habits and patterns. In an alternative embodiment, a wireless service provider may instead initiate this request as it may have detected an excessive quantity of notices sent by the feed server 110 to the electronic device 150 advising the electronic device 150 to request content again at a later time. This may indicate that the electronic device 150 may not be using its time efficiently and as an additional consequence, the network resources and server infrastructure of the wireless service provider are being unnecessarily burdened. The wireless service provider may be interested in electronic devices 150, 160, 170 receiving the best use of the wireless service they get under their service plans with the wireless service provider. In the alternative embodiment, by initiating this contact with the electronic device 150, the wireless service provider may ultimately better serve its customer, the electronic device 150, as well as promote more efficient use of its own network resources and server infrastructure.

At block 404, the feed server 110 examines the typical daily content request schedule used by the electronic device 150. The feed server 110 examines when and how often the electronic device 150 submits its content update requests, the specific content being requested, and to what extent the electronic device 150 may include more than one content update request in each call or other transmission initiated to the feed server. The feed server 110 is able to determine how many of the content requests initiated by the electronic device 150 are met with notifications from the feed server 110 to the electronic device 150 to request the content again at a later time and how many are concluded with the electronic device 150 successfully receiving the requested updated content.

At block 406, the feed server 110 examines the normal refresh update schedules of the content sources regularly accessed by the electronic device 150. By examining this information in conjunction with the typical daily content request schedule examined at block 404, the feed server 110 will be able to determine how efficiently the electronic device 150 is using its wireless service in making content requests.

At block 408, the feed server 110 calculates the impact the current content request is placing on the network and server infrastructure of the wireless service provider. While the actions of a single electronic device 150 may not have a material impact on the infrastructure of a wireless service provider, if a plurality of electronic devices 150, 160, 170 is engaging in inefficient content request behavior, this may have a measurable impact on the components of the system 100.

At block 410, the feed server 110, determines a restructuring of the content request schedule of the electronic device 150 to align more closely with the content refresh schedule of the content sources typically accessed by the electronic device 150. This realignment may comprise the electronic device 150 requesting content at different times or requesting content using the existing schedule but altering the arrangement of specific items of content requested in the content requests to the feed server 110. The realignment may result in the electronic device 150 eventually needing to initiate fewer but differently scheduled content requests to the feed server 110 with the electronic device 150 ultimately receiving improved results in terms of receiving fewer callback messages from the feed server 110. The electronic device 150, for example, may be able to reduce the number of content requests it initiates to the feed server 110 from fifteen per day to five per day with improved customer satisfaction.

At block 412, the feed server 110 furnishes the recommended realigned content request schedule to the electronic device 150 and at block 414, the electronic device 150 implements the realigned content request schedule. In an embodiment, the electronic device 150 may not be required to implement the realigned content request schedule. In an embodiment, the realigned content request schedule may be adjusted subsequent to implementation by the electronic device 150 when variations in content availability occur and/or the preferences of the electronic device 150 change.

Figure 5:
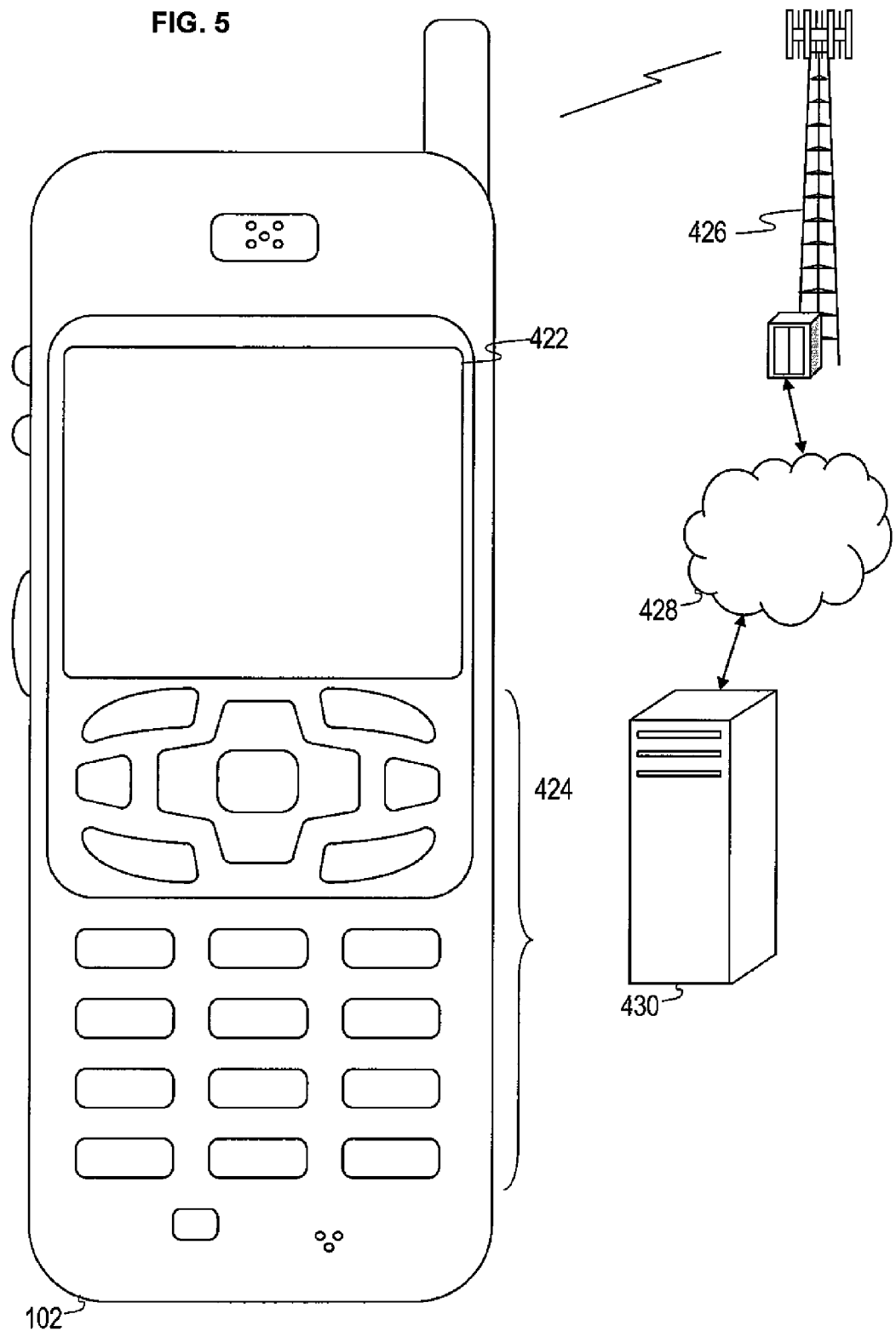
FIG. 5 is an illustration of a mobile device according to an embodiment of the disclosure.

FIG. 5 shows a wireless communications system including the mobile device 102. In an embodiment, the mobile device 102 is equivalent to the electronic device 150, 160, 170. FIG. 5 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 422 and a touch-sensitive surface or keys 424 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 422 to show a web page. The web page may be obtained via wireless communications with a base transceiver station (BTS) 426, a wireless network access node, a peer mobile device 102 or any other wireless communication network or system. While a single base transceiver station 426 is illustrated, it is understood that the wireless communication system may comprise additional base transceiver stations. In some instances, the mobile device 102 may be in communication with multiple base transceiver stations 426 at the same time. The base transceiver station 426 (or wireless network access node) is coupled to a wired network 428, such as the Internet. Via the wireless link and the wired network, the mobile device 102 has access to information on various servers, such as a server 430. The server 430 may provide content that may be shown on the display 422. Alternately, the mobile device 102 may access the base transceiver station 426 through a peer mobile device 102 acting as an intermediary, in a relay type or hop type of connection.

Figure 6:
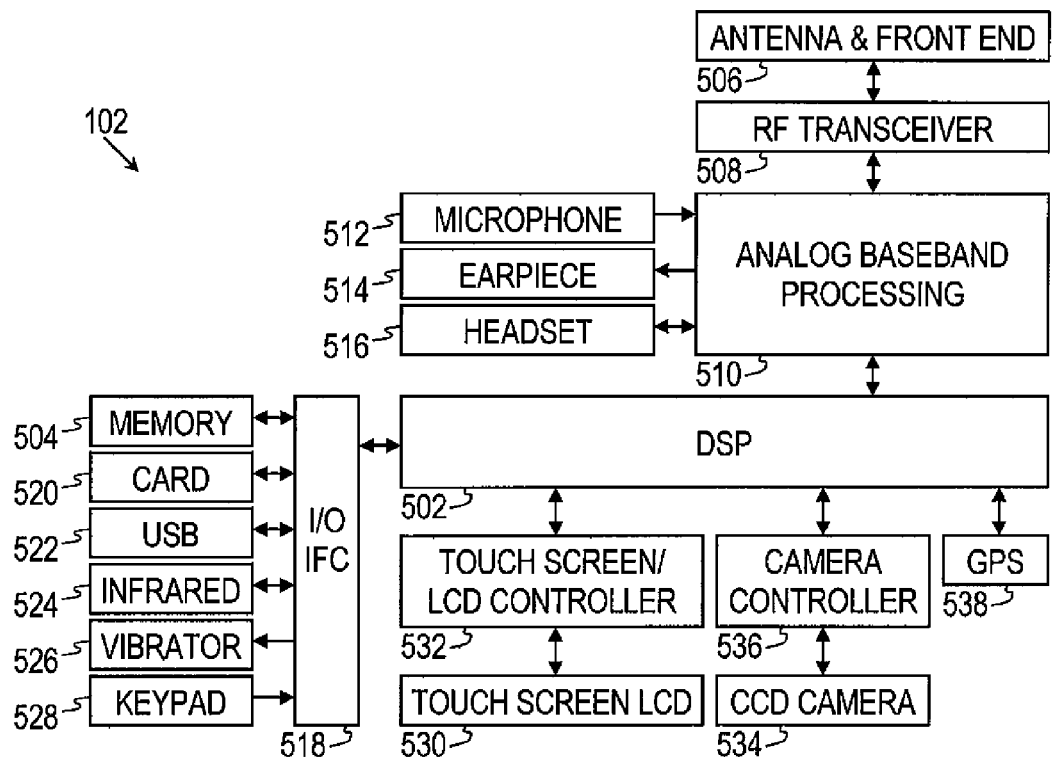
FIG. 6 is a block diagram of a mobile device according to an embodiment of the disclosure.

FIG. 6 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 7:
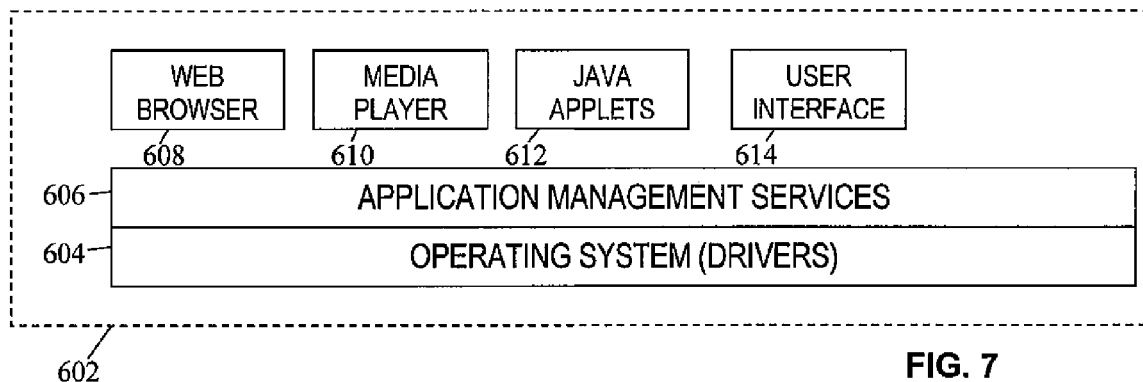
FIG. 7 is a block diagram of a software configuration for a mobile device according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 7 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The user interface 614 may allow the user of the mobile device 102 to configure a data request schedule.

Figure 8:
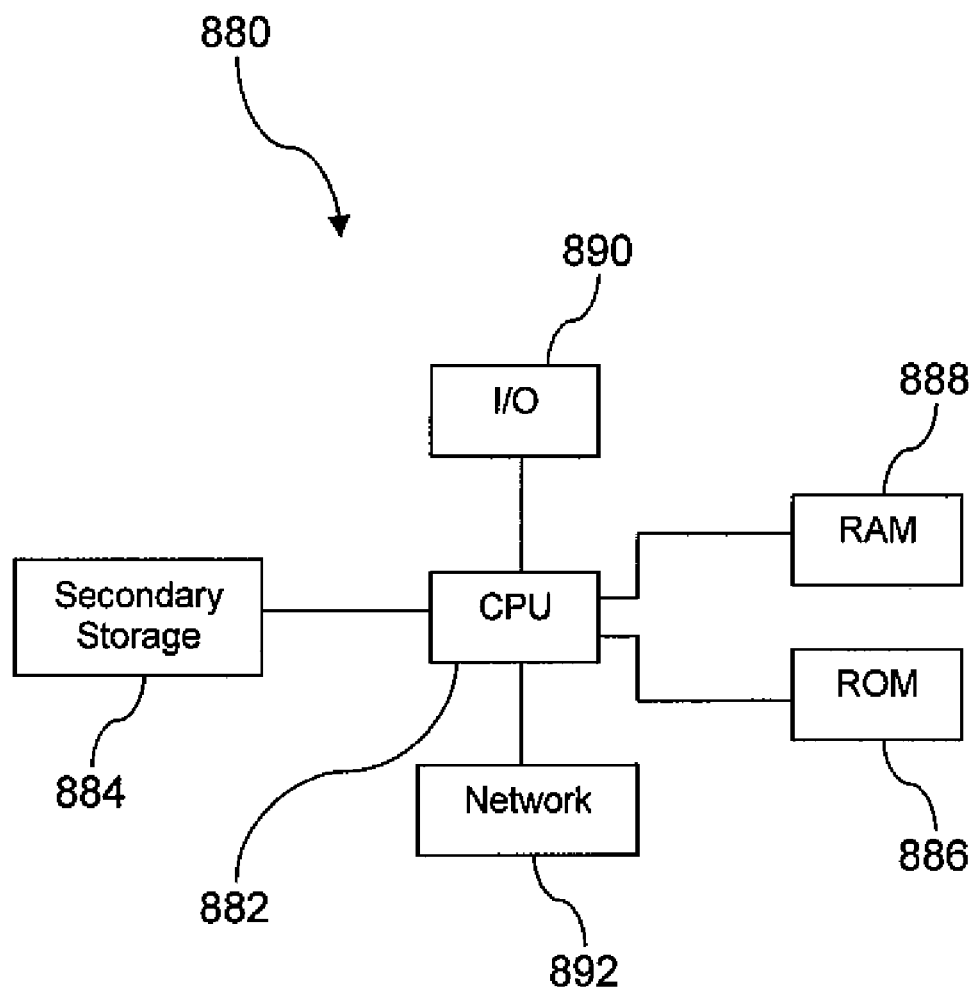
FIG. 8 illustrates an exemplary computer system suitable for implementing some aspects of the several embodiments of the disclosure.

Some aspects of the system described above may be implemented on a computer with sufficient processing power, memory resources, and network throughput capability to handle the necessary workload placed upon it. FIG. 8 illustrates a typical computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

It is understood that by programming and/or loading executable instructions onto the computer system 880, at least one of the CPU 882, the RAM 888, the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of retrieving and delivering requested content, comprising:

a feed server receiving a first message from a first electronic device containing a request for content and receiving a second message from a second electronic device containing a request for the same content;

the feed server reading in the first message a first time record associated with a previous update to the content received by the first electronic device;

the feed server reading in the second message a second time record associated with a previous update to the content received by the second electronic device;

the feed server comparing the first time record and the second time record with a cache time record, the cache time record associated with the requested content stored on a cache server;

the feed server determining that the first time record and the second time record match the cache time record;

the feed server sending a first response message to the first electronic device in response to the feed server determining that the first time record matches the cache time record, the first response message advising that the content associated with the first time record is the most currently available content and the first response message further containing advice to resend the request for content at a first scheduled time, wherein the first scheduled time is based on when the requested content is to be updated at the cache server;

the feed server sending a second response message to the second electronic device in response to the feed server determining that the second time record matches the cache time record, the second response message advising that the content associated with the second time record is the most currently available content and the second response message further containing advice to resend the request for content at a second scheduled time, wherein the second scheduled time is based on when the requested content is to be updated at the cache server plus an interval.

2. The method of claim 1, wherein the feed server adding the interval to the second scheduled time promotes staggering of the resending of the request by the second electronic device.

3. The method of claim 2, wherein staggering the first and second scheduled times distributes load of resend requests for content over time.

4. The method of claim 1, wherein staggering the first and second scheduled times is used when the feed server receives at least one of heavy and concentrated requests for content from electronic devices.

5. The method of claim 1, wherein the content comprises at least one of a stock market quotation, a score of a sporting event, a weather forecast, and a flight arrival time.

6. The method of claim 1, wherein the first and second scheduled times for resend requests are staggered by time periods comprising one of milliseconds, seconds, and minutes.

7. The method of claim 1, wherein the feed server sending messages containing advice to resend content requests at the first and second scheduled times promotes electronic devices to terminate their calls and frees up the electronic devices to receive incoming voice calls.

* * * * *